(12) United States Patent
Muth et al.

(10) Patent No.: US 7,415,488 B1
(45) Date of Patent: Aug. 19, 2008

(54) SYSTEM AND METHOD FOR REDUNDANT STORAGE CONSISTENCY RECOVERY

(75) Inventors: John A. Muth, Scotts Valley, CA (US); Oleg Kiselev, Palo Alto, CA (US); Craig K. Harmer, San Francisco, CA (US)

(73) Assignee: Symantec Operating Corporation, Mountain View, CA (US)

( * ) Notice: Subject to any disclaimer, the term of this patent is extended or adjusted under 35 U.S.C. 154(b) by 473 days.

(21) Appl. No.: 11/027,650

(22) Filed: Dec. 31, 2004

(51) Int. Cl.
*G06F 12/00* (2006.01)
*G06F 11/00* (2006.01)

(52) U.S. Cl. .......................... 707/202; 714/6
(58) Field of Classification Search ................. 707/200, 707/202; 711/162; 714/6
See application file for complete search history.

(56) References Cited

U.S. PATENT DOCUMENTS

| | | | |
|---|---|---|---|
| 6,397,308 B1 | 5/2002 | Ofek et al. | |
| 6,662,268 B1 | 12/2003 | McBrearty et al. | |
| 6,671,705 B1 | 12/2003 | Duprey et al. | |
| 6,735,603 B2 | 5/2004 | Cabrera et al. | |
| 6,745,305 B2 | 6/2004 | McDowell et al. | |
| 6,820,217 B2 | 11/2004 | Mock et al. | |
| 6,823,349 B1 | 11/2004 | Taylor et al. | |
| 6,898,681 B2* | 5/2005 | Young | 711/162 |
| 6,907,507 B1* | 6/2005 | Kiselev et al. | 711/162 |
| 6,910,098 B2 | 6/2005 | LeCrone et al. | |
| 6,915,381 B2 | 7/2005 | Fujie et al. | |
| 6,934,904 B2 | 8/2005 | Talagala et al. | |
| 6,944,785 B2 | 9/2005 | Gadir et al. | |
| 6,950,833 B2 | 9/2005 | Costello et al. | |
| 6,988,171 B2* | 1/2006 | Beardsley et al. | 711/144 |
| 6,996,586 B2* | 2/2006 | Stanley et al. | 707/203 |
| 7,000,145 B2* | 2/2006 | Werner et al. | 714/20 |
| 7,007,044 B1* | 2/2006 | Rafert et al. | 707/203 |
| 7,039,661 B1* | 5/2006 | Ranade | 707/204 |
| 7,047,358 B2* | 5/2006 | Lee et al. | 711/114 |
| 7,065,674 B2 | 6/2006 | Cabrera et al. | |

(Continued)

OTHER PUBLICATIONS

"Lustre: A Scalable, High-Performance File System," Cluster File Systems, Inc., Lustre Whitepaper Version 1.0, Nov. 11, 2002, 13 pages.

(Continued)

*Primary Examiner*—John Breene
*Assistant Examiner*—Joshua Bullock
(74) *Attorney, Agent, or Firm*—Robert C. Kowert; Meyertons, Hood, Kivlin, Kowert & Goetzel, P.C.

(57) ABSTRACT

A file system may selectively perform redundancy consistency recovery and synchronization of mirrors and may store dirty file information in a log or journal that indicates the modification of a file. A file system may update saved dirty file information to indicate successful modification of data across mirrors and may keep track of redundancy consistency recovery information on a file-by-file basis or may track the redundancy consistency of portions of files. A file system may also instruct an underlying storage system not to track data modifications, possibly selectively for each I/O request. During synchronization the file system may synchronize its log and use saved dirty file information to determine files to be synchronized. A file system may selectively use file system logging for individual data modification requests and may expose an API allowing applications to specify a redundancy consistency mechanism.

20 Claims, 11 Drawing Sheets

U.S. PATENT DOCUMENTS

| | | |
|---|---|---|
| 7,069,402 B2 | 6/2006 | Coulter et al. |
| 7,089,384 B2 * | 8/2006 | Tross et al. .................. 711/162 |
| 7,152,147 B2 * | 12/2006 | Suzuki ....................... 711/162 |
| 7,188,223 B1 * | 3/2007 | Haase et al. ................. 711/162 |
| 7,194,487 B1 * | 3/2007 | Kekre et al. ................. 707/201 |
| 2003/0028514 A1 | 2/2003 | Lord et al. |
| 2004/0039888 A1 | 2/2004 | LeCroune et al. |
| 2004/0139125 A1 | 7/2004 | Strassburg et al. |
| 2005/0050273 A1 | 3/2005 | Horn et al. |

OTHER PUBLICATIONS

Goodson, et al., "Decentralized Storage Consistency via Versioning Servers," School of Computer Science, Carnegie Mellon Univ., Sep. 2002, 16 pages.

U.S. Appl. No. 11/027,624, filed Dec. 31, 2004.

* cited by examiner

SYSTEM AND METHOD FOR REDUNDANT STORAGE CONSISTENCY RECOVERY

BACKGROUND OF THE INVENTION

1. Field of the Invention

This invention relates to data storage in general and, more particularly, to file system based redundant storage consistency recovery.

2. Description of the Related Art

Modern distributed shared storage environments may include multiple storage objects connected via one or more interconnection networks. The interconnection networks provide the infrastructure to connect the various elements of a distributed shared storage environment. Within the storage environment, file system abstractions may be built on top of multiple storage objects. These storage objects may be physical disks or storage aggregations, like logical volumes that distribute data across multiple storage devices. As the number of logical volumes and file system abstractions grows, the complexity of the entire storage environment grows dramatically.

Storage systems frequently use data redundancy mechanisms to ensure data integrity, consistency, and availability. Other uses for data redundancy may include backing up data, distributed load sharing, disaster recovery, or point-in-time analysis and reporting. When keeping redundant data in mirrored volumes, a storage system may duplicate data written to one mirror to all other mirrors. In other words, a storage system may duplicate data written to one copy of a data block stored in a volume to all other copies of that data block stored in that volume. Frequently this copying is done synchronously when the data I/O is preformed. Sometimes, however this mirroring may be performed asynchronously. When keeping redundant data in Redundant Arrays of Independent Disks (RAID) volumes, data may be striped across several devices (columns), and rather than store a complete additional copy of the data, one or more parity values may be calculated for sub-ranges of that data and stored with the data. On failure of any one device (or more than one device in some RAID implementations), parity may be used to reconstruct the data stored on the failed device. Mirroring is a low-order version of RAID (RAID 1).

Under some failure conditions, volumes including redundancy data may require consistency recovery (sometimes called synchronization or "resilvering" for mirrored volumes). For example, a host may crash during a write to a mirrored volume, or a component in the interconnect infrastructure for one of the mirrored devices may fail. This may result in data being written to some of the mirrors but not others, leaving the volume in an inconsistent state. That is, multiple reads of the same block from the volume may end up being routed to different mirrors and thus returning different data, possibly causing serious data corruption. In such situations, a consistency recovery operation may need to be performed to resynchronize the data contents and state of mirrored storage devices. One well known mirror synchronization method involves copying the entire contents of one data mirror of a volume to all other mirrors of that volume, such that all mirrors have the same data contents. This process can take a very long time in even modestly sized storage configurations. To reduce the impact of mirror consistency recovery, another well-known consistency recovery method involves maintaining a bitmap of in-progress I/Os, sometimes called "scoreboarding" or "dirty region mapping." Every bit in this bitmap represents a region of one or more blocks of the volume. A bit in this map is set, or "dirtied", when an I/O to the volume is issued and cleared after the I/O has completed for all mirrors. Recoverability and correctness require that the write, or "flush", of a dirtied bitmap must complete before the write to the data blocks can proceed. To reduce overhead on the data writes, cleaning of dirty bits can be delayed and performed asynchronously without impacting correctness. The size of the region mapped by each bit impacts the write I/O performance, requiring fewer bitmap writes when each bit represents more data blocks. However, the larger the number blocks represented by a single bit in the map, the larger the number of blocks required to be copied during consistency recovery. Copying blocks that are mapped by a dirty bit in the scoreboard, but in fact were not being written, may significantly increase the time taken by the recovery.

SUMMARY

A file system may direct redundancy consistency recovery and synchronization of redundant volumes using dirty file information, according to various embodiments. A file system may save dirty file information in response to data modification requests from a client application to write data to a particular file. In some embodiments, rather than relying upon the underlying storage system to track the redundant data storage, a file system may mark the file as dirty in its own file system log or journal. In addition, a file system may specifically instruct a storage system not to track regions written to by certain types of write requests. If a file system crashes, or some other system error occurs that requires redundancy consistency recovery, the file system may then read its log to determine what files were in the process of being modified when the crash or error occurred and therefore may be in need of redundancy consistency recovery. In some embodiments, a file system may recover the redundancy consistency of the file system log before reading the log's content to determine files that need redundancy consistency recovery. In one embodiment, the file system may examine the log entries to determine specific files or region of files that need redundancy consistency recovery. After analyzing the saved dirty file information and determining that a file is dirty, a file system may perform recovery of redundant data in that file (or the modified portions of that file as indicated in the log) without having to recover blocks that were not impacted by the writes, thereby possibly reducing the amount of I/O activity required to bring the redundant data storage into consistency.

When saving dirty file information to a file system journal or log, a file system may also update that dirty file information to indicate that the file modifications to the redundant storage have been successfully completed, that is data has been written to all mirrors of the volume in a mirrored data volume configuration, or the data modifications have otherwise been successfully completed to the redundant storage. A file system may keep track of portions of individual files and update the saved dirty information as portions of the file are written to the redundant data volume. In some embodiments, the file system may selectively use either file system logging to record redundancy consistency recovery information or allow the storage system to keep track of redundancy consistency information. In one embodiment, the file system may determine, for each data modification request, which redundancy consistency recovery mechanism to use.

While the invention is described herein by way of example for several embodiments and illustrative drawings, those skilled in the art will recognize that the invention is not limited to the embodiments or drawings described. It should be understood, that the drawings and detailed description thereto are not intended to limit the invention to the particular form disclosed, but on the contrary, the intention is to cover all modifications, equivalents and alternatives falling within the spirit and scope of the present invention as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include", "including", and "includes" mean including, but not limited to.

DETAILED DESCRIPTION OF EMBODIMENTS

Figure 1:
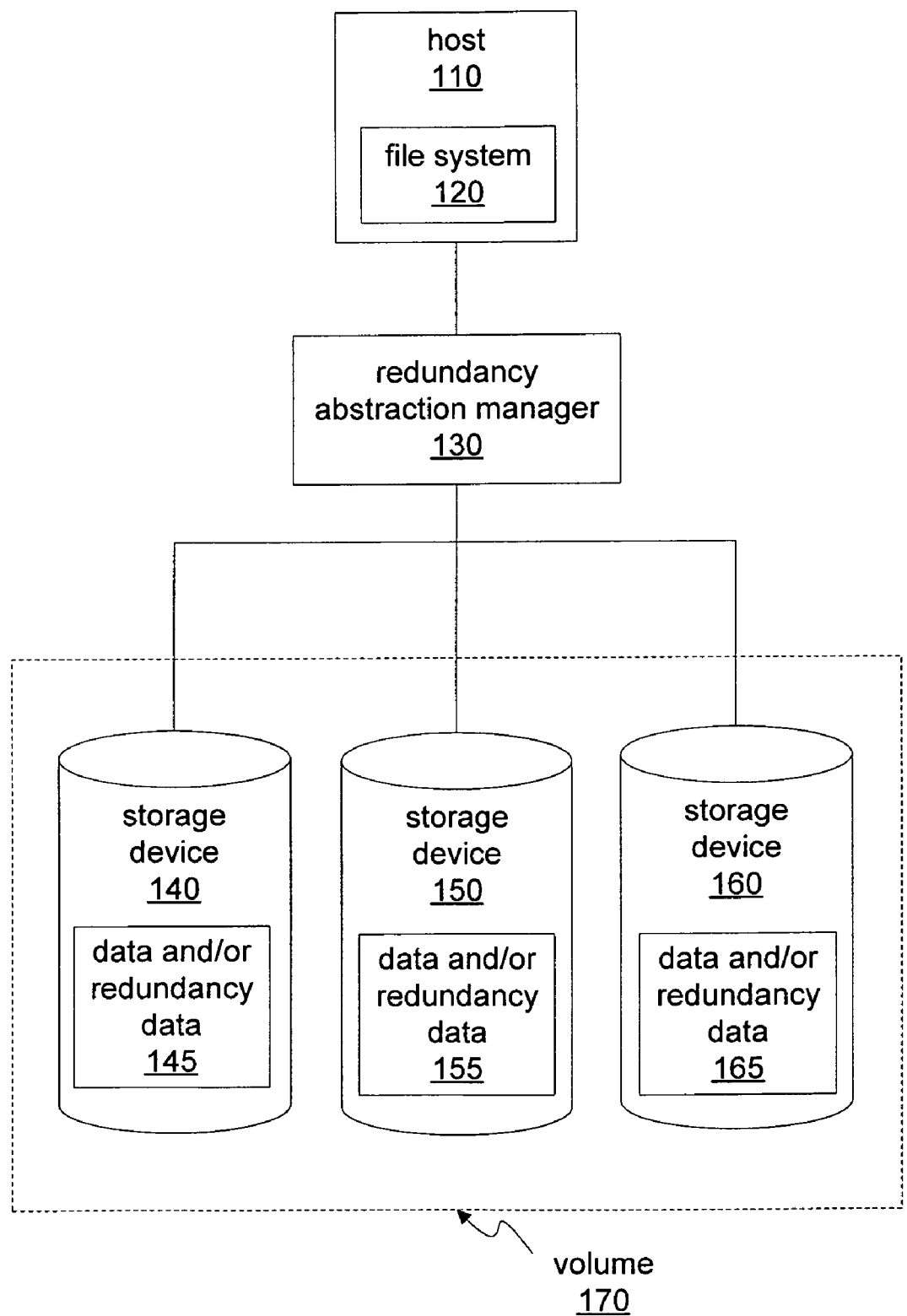
FIG. 1 is a block diagram illustrating, according to one embodiment, a system capable of implementing embodiments of file system based redundancy consistency recovery as described herein.

FIG. 1 illustrates one example of a storage system that may, according to certain embodiments, implement file system based redundancy consistency recovery. The specific configuration of devices illustrated in FIG. 1 is just one of various configurations on which file system based redundancy consistency recovery may be implemented. As illustrated in FIG. 1, a host device, such as host 110 may include file system 120 that may provide file system services to various client applications not illustrated in FIG. 1. File system 120 may utilize data storage on storage devices, such as storage devices 140, 150, and 160, and may rely upon an abstraction layer, such as provided by redundancy abstraction manager 130 when writing data to and/or reading data from the storage devices. File system processes, or software, such as file system 120 on host 110 may provide an interface between client applications and the data available on volume 170 through redundancy abstraction manager 130. For example, in one embodiment redundancy abstraction manager 130 may be a volume manager and may abstract or virtualize the data on storage devices 140, 150 and 160 into a single volume, such as volume 170, and present that abstraction to file system 120. File system 120 may also perform a naming function allowing applications to allocate and access a set of data, such as a file, by a name, rather than by referring to the actual physical allocation of data on storage devices.

While file system based redundancy consistency recovery is described herein using redundancy abstraction manager 130 and volume 170, as illustrated in FIG. 1, it should be noted that file system based redundancy consistency recovery may be implemented on any of a number of storage systems comprising redundant storage. Redundancy abstraction manager 130, and storage devices 140, 150, and 160, including volume 170 and data and/or redundancy data 145, 155, and 165, represent only one example of such a storage system. For example, volume 170 may be a mirrored volume, a RAID volume, or, in general, any type of aggregated storage system that provides redundant storage. Additionally, file system based redundancy consistency recovery as described herein may be performed by a file system, or in general, any type of system that manages data and attributes on a data storage system, according to various embodiments. For example, in one embodiment, a file system residing on a host device may perform file system based redundancy consistency recovery, as illustrated by file system 120 in FIG. 1. In other embodiments, file system based redundancy consistency recovery may be performed by any type of data and attribute management system residing on any of a number of different types of systems, including, but not limited to: a host device, a storage device, or an object based storage device.

Redundancy abstraction manager 130 may reside on any of a number of different physical devices, according to various embodiments. For example, in one embodiment, Redundancy abstraction manager 130 may reside on host 110 along with file system 120, while in another embodiment, abstraction of mirrored storage may reside on a storage system device that is part of the storage sub-system including storage devices 140, 150, and 160. In yet other embodiments, redundancy abstraction manager 130 may reside on a separate networked device, such as a router or switch communicably coupled to both host 110 and storage devices 140, 150, and 160. In general, redundancy abstraction manager 130 may reside in any of various devices able to communicate with both host devices and storage devices, according to various embodiments.

Redundancy abstraction manager 130 may, in some embodiments, be a mirroring volume manager. A mirrored volume may contain multiple copies of data, usually called mirrors, of the data on that volume. Redundancy abstraction manager 130 may mirror data on one or more mirrors comprising volume 170 by copying the data from one mirror to other mirrors. In one embodiment, data and/or redundancy data 145, 155, and 165 may each represent a mirror of volume 170 and may all reside on the same types of physical storage devices, each configured in the same manner. In other embodiments, however, data and/or redundancy data 145, 155, and 165 may reside on different numbers and configurations of physical storage devices. In some embodiments, data and/or redundancy data may include data stored on a single magnetic disk drive type storage device. Data and/or redundancy data 145, 155, and 165 may also include, but are not limited to, one or more of RAID (Redundant Array of Independent Disks) systems, disk arrays, JBODs (Just a Bunch Of Disks, used to refer to disks that are not configured according to RAID), tape devices, optical storage devices, non-volatile memory devices (Flash, MEMS, and others), and/or other block or sector-oriented non-volatile random-access storage devices according to different embodiments. In some embodiments, storage devices 140, 150 and 160 may also be file servers (typically referred to as NAS, or Network Attached Storage) or object based storage devices (typically referred to as OSD), which present a different data access paradigm from the traditional block or sector oriented access mechanisms, but can be used by redundancy abstraction manager 130 to store data much like the previously mentioned block or sector-oriented devices. While FIG. 1 illustrates, according to one embodiment, a storage system including three storage devices, other embodiments may include additional or fewer storage devices.

As noted above, volume 170 may, in some embodiments, include multiple mirrors, such as mirrors 145, 155, and 165. A mirror may span more than one physical storage device, and thus, storage devices 140, 150, and 160 illustrated in FIG. 1 may each represent multiple physical storage devices, according to various embodiments. Additionally, each mirror may reside on storage devices implementing different data storage formats, in different embodiments. For example, in one embodiment, storage device 140 may represent a single physical disk drive storing mirror 145, while storage device 150 may represent multiple storage devices in a RAID configuration that holds data and/or redundancy data 155. Thus, the various mirrors of a single mirrored volume may be maintained on multiple heterogeneous storage sub-systems.

The data of a mirrored volume 170 may be mirrored or copied across mirrors (data and/or redundancy data) 145, 155, and 165. For example, in one embodiment, whenever data is written to mirror 145 the same data may also be written to mirrors 155 and 165. Thus, the data on storage devices 140, 150, and 160 may comprise a mirrored volume, storing multiple copies of volume's data. In one embodiment, redundancy abstraction manager 130 may perform the actual mirroring of data written by file system 120 across the mirrors. For example, in one embodiment, whenever data is written to the mirror stored on device 140 the same data may also be written to the mirrors stored on devices 150 and 160. Various mechanisms may be utilized to ensure the consistency of data stored in the mirrors of a mirrored data storage volume, such as file system based redundancy consistency recovery, as described herein.

A host system, such as host 110 may be any of various types of devices, including, but not limited to, personal computer systems, desktop computers, laptop or notebook computers, mainframe computer systems, workstations, network appliances, network computers, Internet appliances, or in general any type of networkable computing device capable of communicating with other processes or devices in a distributed storage environment. Host system 110 may include at least one processor. The processor may be coupled to memory. Memory is representative of various types of possible memory media, also referred to as "computer readable media." Hard disk storage, floppy disk storage, removable disk storage, flash memory and random access memory (RAM) are examples of memory media. The terms "memory" and "memory medium" may include an installation medium, e.g., a CD-ROM or floppy disk, a computer system memory such as DRAM, SRAM, EDO RAM, SDRAM, DDR SDRAM, Rambus RAM, etc., or a non-volatile memory such as a magnetic media, e.g., a hard drive or optical storage. The memory medium may include other types of memory as well, or combinations thereof.

Distributed storage systems may be implemented using a wide variety of technologies such as Enterprise Systems Connection (ESCON), Fiber Distributed Data Interface (FDDI), Asynchronous Transfer Mode (ATM), IBM's Serial Storage Architecture (SSA), and Fibre Channel. Storage system architectures may also implement a number of underlying protocols, including TCP/IP and variants of SCSI (Small Computer System Interface). One popular technology for storage systems is based on SCSI over Fibre channel. Fibre Channel Protocol (FCP) specifies how to run the SCSI command set over a dedicated Fibre Channel optical fabric. In direct server attached storage, a local SCSI controller on a peripheral bus fulfills a data request initiated by a SCSI driver in the host server. A LUN (logical unit number) is the SCSI identifier of a logical unit within a target, the system component that receives a SCSI I/O command. A logical unit is an entity within a SCSI target that executes I/O commands. SCSI I/O commands are sent to a target and executed by a logical unit within that target. A SCSI physical disk typically has a single logical unit. Tape devices and array controllers may incorporate multiple logical units to which I/O commands may be addressed. Each logical unit exported by an array controller may correspond to a virtual disk. Storage systems may be deployed in both homogeneous and heterogeneous environments. In a heterogeneous environment, a storage system may allow different kinds of servers, e.g. Windows NT, UNIX, Linux, Netware, and OS/390, to share different kinds of storage, e.g. disk, tape, and Redundant Arrays of Independent Disks (RAID). With this shared capacity, organizations may be able to acquire, deploy, and use storage devices more cost-effectively.

The devices illustrated in FIG. 1, may be communicably coupled using any of various network technologies, according to various embodiments. For example, such a system, as illustrated in FIG. 1, may communicate across a local area network, wide area network, intranet network, Internet network, or many other types of network. Such a network may be designed to be continuously available (although network outages may occur), or may be intermittent (e.g. a modem connection made between a computer system in a user's home and a computer system in a user's workplace). Additionally, the devices in FIG. 1 may communicate utilizing any of a number of different physical networking technologies including, but not limited to, Fiber Channel, Ethernet, Fast-Ethernet, Gigabit-Ethernet, Myrinet, Infiniband, VAX CI, or ServerNet, or others. According to various embodiments, the devices in FIG. 1 may be configured according to a number of different network topologies including, but not limited to, star, token-ring, token-bus, scatternet, dual-ring, mesh, etc. and may also be configured to utilize a combination of different networking technologies and/or topologies. Additionally, the system illustrated in FIG. 1 may comprise shared storage or shared memory for communicating between different computer systems or between processes within the same computer system, according to some embodiments. Embodiments not illustrated by FIG. 1 may also include an interconnect network for any of various distributed shared storage environments, including, but not limited to, network file system (NFS), common Internet file system (CIFS), storage area network (SAN), network attached storage (NAS), storage-network aggregation, multi-site block storage, object-based storage devices (OBSD), or other asymmetric, out-of-band, or shared storage models.

Figure 2A:
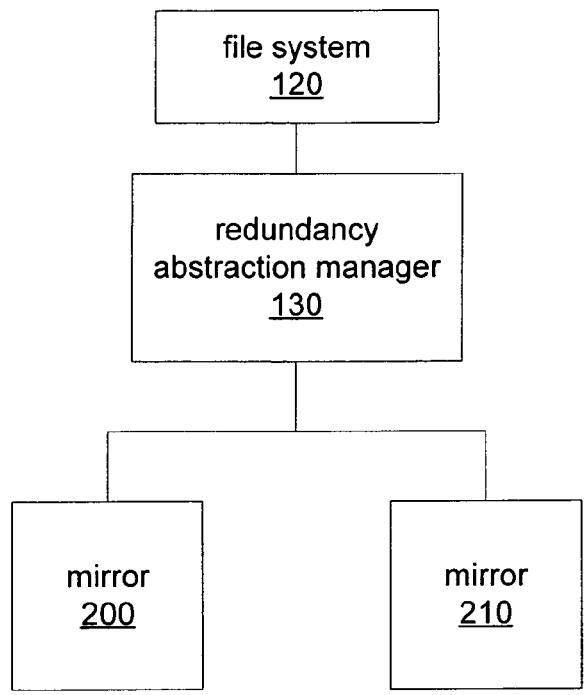
FIG. 2a is a block diagram illustrating the logical connections of a mirrored volume based storage system capable of implementing embodiments of file system based redundancy consistency recovery, according to one embodiment.

FIG. 2a is a block diagram illustrating the logical connections of a system implementing embodiments of file system based redundancy consistency recovery for a storage system including multiple mirrored copies of data. As illustrated in FIG. 2a, a file system, such as file system 120 may communicate with redundancy abstraction manager 130 to access mirrors 200 and 210. Please note that while FIG. 2a illustrates two mirrors, other embodiments may include additional mirrors. In some embodiments, a file system may save metadata or information regarding intended data modifications, but not the data itself at the file system level, such as in a file system log or journal. File system metadata may be defined as information that file system software maintains about data stored in the file system. File system metadata may include, but is not limited to, definitions and descriptions of the data it references. File system metadata may also include, but is not limited to, information about one or more of inodes, directories, mapping information in the form of indirect blocks, superblocks, etc. Generally, file system metadata for a file includes the name for the file as seen from an application, various file attributes (which differ among file systems), and corresponding file system location information (e.g. logical or physical devices on which parts of the file are stored and block offsets and lengths of those parts of the file). File system metadata may itself be stored on a logical or physical device within a file system. A file system log, intent log, or metadata log, may be different from a more traditional data log where a file system saves a temporary copy of all data being written to a storage system.

File system 120 may be configured to store dirty file information at the file system level, such as in a file system log, an intent log, or a metadata log, according to various embodiments. One benefit to saving dirty file information in a file system log is that, in some embodiments, a file system may already be saving information to a file system log and may therefore be able to save dirty file information in the same log without incurring an additional I/O to save the dirty file information in a structure dedicated specifically to mirror synchronization recovery information, such as a dirty region map.

File system 120 may also be configured to use saved dirty file information from a file system log during mirror synchronization, perhaps after a system crash or other error which may result in I/O operations in progress at the moment of the error not completing to all mirrors. In certain embodiments, file system 120 may be configured to communicate with redundancy abstraction manager 130 regarding whether or not redundancy abstraction manager 130 should apply a specific redundancy consistency recovery mechanism to specific data I/O requests. Redundancy abstraction manager 130 may be configured to implement dirty region tracking for redundancy consistency recovery, and file system 120 may be able to instruct redundancy abstraction manager 130 not to use its dirty region tracking for specific data modifications. Redundancy abstraction manager 130 may represent any of various types of storage systems, according to different embodiments. For example, in one embodiment, redundancy abstraction manager 130 may represent a volume manager or other process that virtualizes the underlying physical storage into logical volumes or other aggregates of data for a file system.

File system 120 may be configured to inform redundancy abstraction manager 130 whether or not to apply the storage manager's redundancy consistency recovery mechanism to specific data writes, in some embodiments. For example, redundancy abstraction manager 130 may expose a programming interface or API allowing file system 120 to turn on and off redundancy abstraction manager 130's tracking of data writes for redundancy consistency recovery purposes. For example, in one embodiment, file system 120 may turn off the mechanism, make one or more data modifications and then turn the mechanism back on. In another embodiment, the actual data write interface between file system 120 and redundancy abstraction manager 130 may include an additional parameter specifying whether that individual data write should be tracked by the storage system's redundancy consistency recovery mechanism.

Figure 2B:
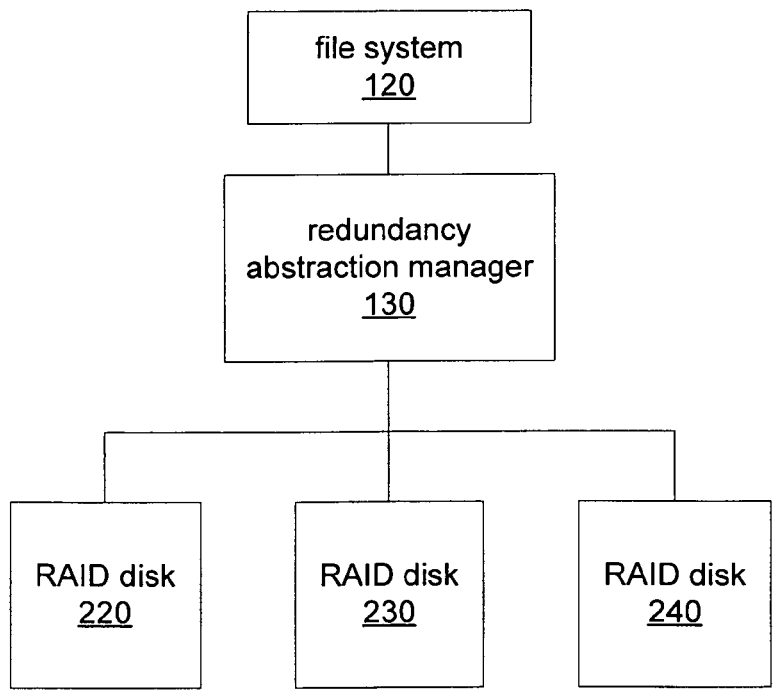
FIG. 2b is a block diagram illustrating the logical connections of a RAID based storage system capable of implementing embodiments of file system based redundancy consistency recovery, according to one embodiment.

FIG. 2b is a block diagram illustrating the logical connections of a system implementing embodiments of file system based redundancy consistency recovery for a system including a RAID volume. For example, RAID disks 220, 230, and 240 may, in one embodiment, be a part of a RAID volume (not illustrated) that provides data redundancy through striping and parity. In some embodiments, the use of parity may involve redundant data produced by performing computations on data that can be used to recover the data if some portion of the data is lost. For example, redundancy abstraction manager 130 may stripe data on RAID Disk 220 and RAID disk 230, and may store parity values on RAID disk 140. Please note that other embodiments may include a different number of RAID disks and may store data and parity values in a different configuration than described herein. File system 120 may communicate with redundancy abstraction manager 130 to access data on RAID disks 220, 230, and 240. Please note that while FIG. 2b illustrates three RAID disks, other embodiments may include fewer or additional RAID disks.

As described above regarding a mirrored volume example, file system 120 may be configured to store dirty file information in a file system log, such as an intent log or a metadata log on a RAID volume, according to various embodiments. In certain embodiments, file system 120 may be configured to store data to a RAID volume using data block sizes compatible with the stripes of the RAID volume. In one embodiment, file system 120 may use a write size equal to the width of a stripe of the RAID volume. In another embodiment, file system 120 may use a write size that is a multiple of the width of a RAID stripe.

File system 120 may also be configured to use saved dirty file information from a file system log during redundancy consistency recovery, perhaps after a system crash or other error which may result in I/O operations in progress at the moment of the error not being completed. In certain embodiments, file system 120 may be configured to communicate with redundancy abstraction manager 130 regarding whether or not redundancy abstraction manager 130 should apply a specific redundancy consistency recovery mechanism to specific data I/O requests. For example, redundancy abstraction manager 130 may be configured to implement redundancy consistency recovery for a RAID volume using dirty region tracking, and file system 120 may be able to instruct redundancy abstraction manager 130 not to use its dirty region tracking for specific data modifications. In another example, redundancy abstraction manager 130 may use a log to implement redundancy consistency recovery for a RAID volume.

Please note that while the examples and embodiments described below refer to a mirrored storage system, other types of storage systems providing data redundancy may also implement redundancy consistency recovery. For example, redundancy consistency recovery may be applied to mirrored volumes, RAID volumes, or in general any storage system providing data redundancy, according to various embodiments.

Figure 3:
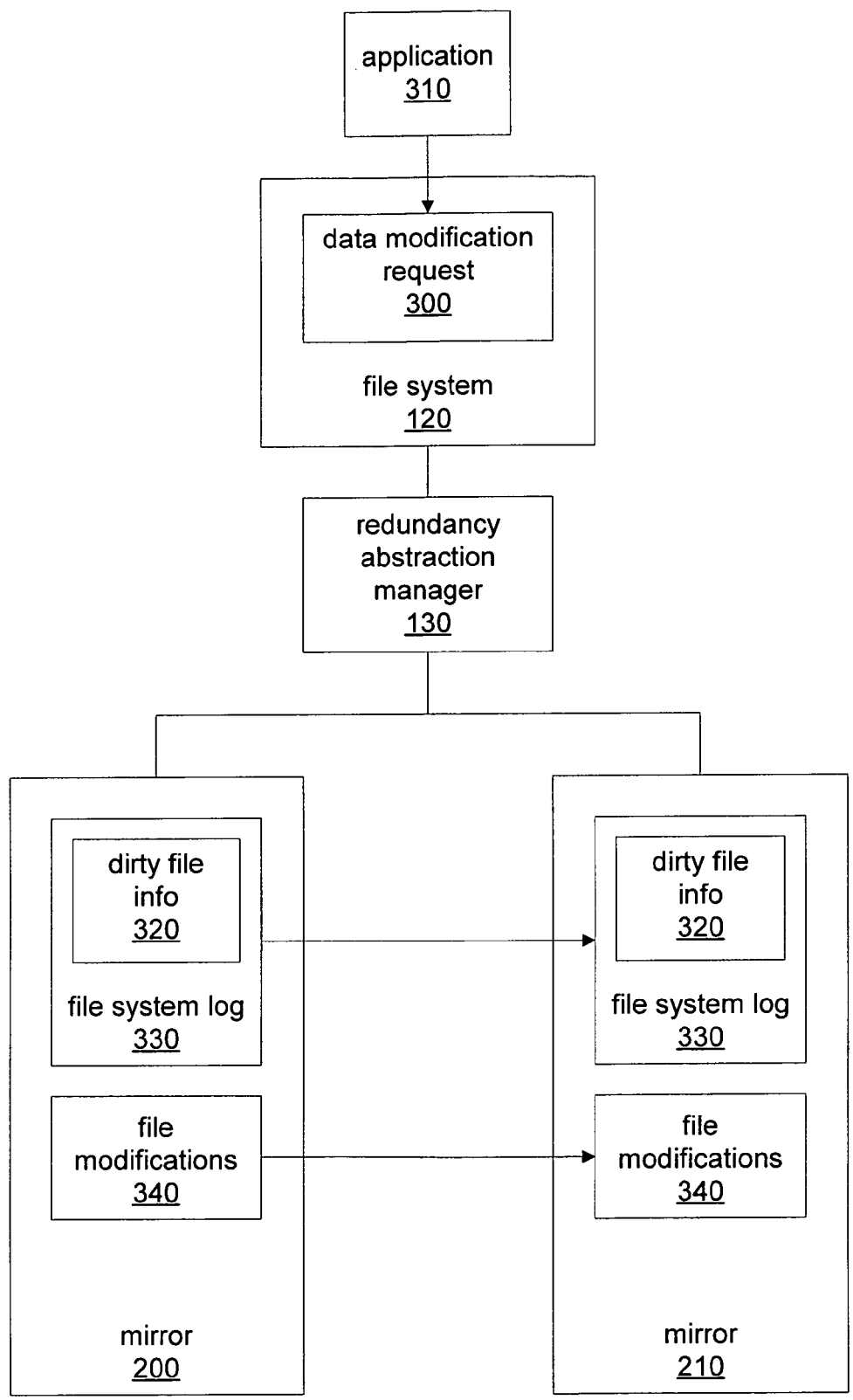
FIG. 3 is a block diagram illustrating one embodiment of a file system log used for redundancy consistency recovery.

FIG. 3 is a block diagram illustrating a file system using a file system log for redundancy consistency recovery on a mirrored storage system, according to one embodiment. As shown in FIG. 3, file system 120 may use a file system log, such as file system log 330, to record redundancy consistency recovery information, according to various embodiments. Redundancy consistency recovery information may, in some embodiments, include information regarding files or portions of files modified recently by the file system where writes may not have been completed to all mirrors of a mirrored volume. For example, a file system could, in one embodiment, save a flag indicating that a file has been modified. In another embodiment, a file system could record specific portions or offsets within the file that have been modified and thus may not have been synchronized successfully. Such information may be used to recover data correctness and redundancy consistency in cases of access interruption caused by hardware, software, or operational failures by allowing the file system to ensure that those data modification are successfully synchronized across all mirrors of the volume during mirror synchronization recovery.

In certain embodiments, a file system may be configured to use an existing mechanism, such as an extended file operation that records which files may require special handling in the event of a system crash. For instance, a file system may already include a mechanism to mark temporary files that should be deleted upon recovery and the file system may, in some embodiments, be configured to extend such a mechanism for use with dirty file information.

In one embodiment, an application, such as application 310, may request a data write to a file by sending data modification request 300 to file system 120. File system 120 may, prior to making the requested data modifications, save dirty file information, such as dirty file info 320, to file system log 330 through redundant storage abstraction manager 200. The exact nature and format of the dirty file information saved by a file system may vary from embodiment to embodiment. For example, in one embodiment, file system 120 may save, in a metadata log entry for a file, a single bit indicating that the file has been modified. In another embodiment, file system 120 may save a larger structure including information indicating one or more portions within the file that have been modified. In general any sort of information or structure that allows a file system to determine files or portions of file that were modified may be used as dirty file information according to various embodiments. In some embodiments, redundancy abstraction manager 130 may be configured to store file system log 330 in a mirrored volume with copies of the log stored in mirrors 200 and 210. File system 120 may not have any knowledge regarding how the mirroring between mirrors 200 and 210 takes place.

According to certain embodiments, file system 120 may first save dirty file information 320 to file system log 330 and after the saving of dirty file information 320 is completed file system 120 may then perform data modifications 340. Redundant storage abstraction manager 120 may then write data modifications 340 to both mirrors and may, in some embodiments, report the completion of data modifications 340 to file system 120. Once data modifications 340 have been completed, file system 120 may update dirty file information 320 to reflect the completion of the data modifications thus ensuring that during mirror synchronization, file system 120 may determine that data modifications 340 have already been completed and no further redundancy consistency recovery regarding data modifications 340 is required. In one embodiment, file system 120 may update dirty file information 320, but in another embodiment, file system 120 may store additional info, such as in an additional log entry, to file system log 330 indicating the completion of data modifications 340. In yet another embodiment, file system 120 may clear or delete dirty file information 320 completely from the file system log 330, thereby reflecting the completion of data modifications 340.

While FIG. 3, illustrates a storage system providing data redundancy through mirroring, similar redundancy consistency recovery mechanism could be performed on a RAID storage system that provides redundancy through striping and parity. For example, file system 120 may save dirty file information 320 to the RAID storage system and may then perform data modification 340 to the storage system. Once data modifications 240 are completed on the RAID system, file system 120 may update dirty file information 320 to reflect the completion of data modifications 240 on the RAID storage system.

Figure 4:
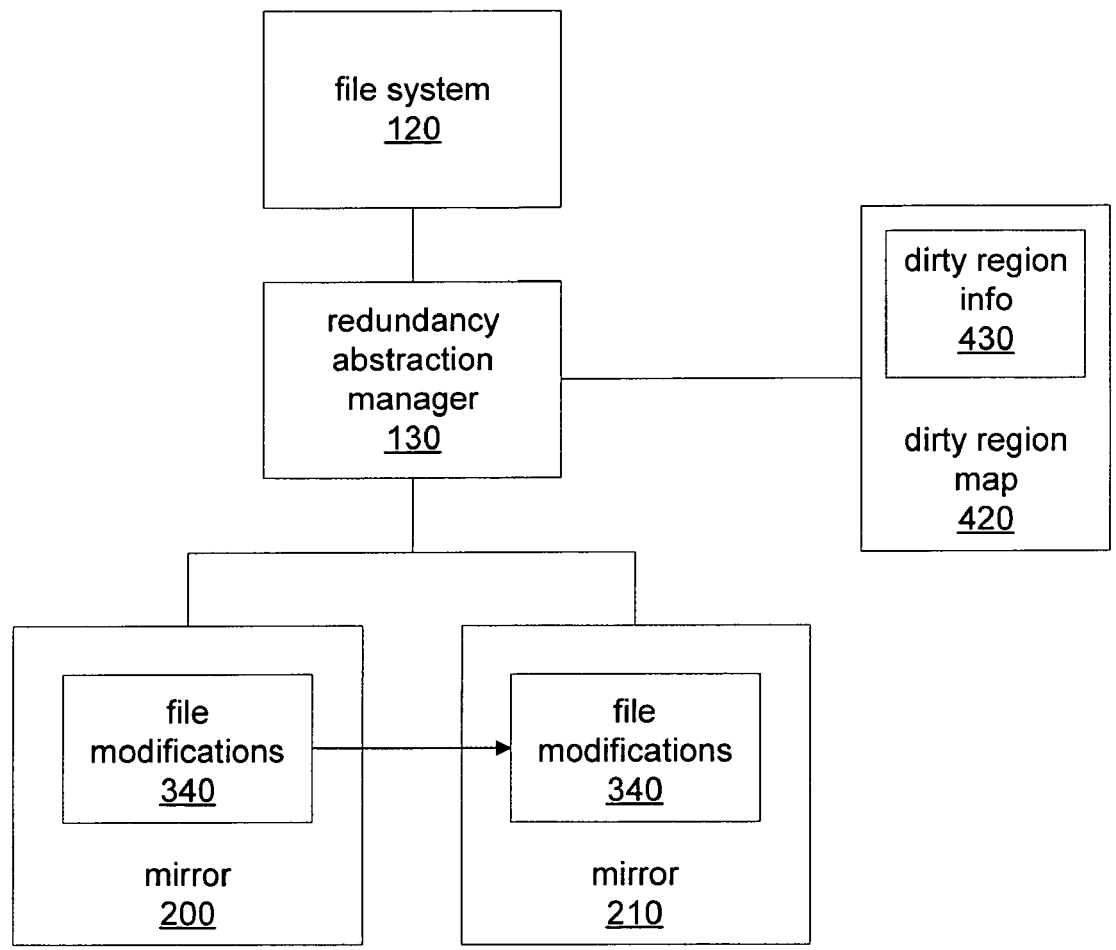
FIG. 4 illustrates the use of a storage system's redundancy consistency recovery mechanism as part of file system based redundancy consistency recovery, according to one embodiment.

FIG. 4 illustrates the use of a storage system's redundancy consistency recovery mechanism as part of file system based redundancy consistency recovery, according to one embodiment. As shown in FIG. 4 and described above, file system 120 may allow redundancy abstraction manager 130 (e.g. a volume manager) to track redundancy consistency recovery information for data modifications, such as data modifications 340 in dirty region map 420 maintained by redundancy abstraction manager 130, according to various embodiments. In other embodiments, file system 120 may be configured to allow a RAID based storage system to track redundancy consistency recovery information for data modifications 340 using a storage system based log different from the file system log used by file system 120. In some embodiments, file system 120 may allow redundancy abstraction manager 130 to use its dirty region map 420 to record redundancy consistency information for file modifications 340. In such an embodiment, redundancy abstraction manager 130 may record dirty region info 430 in dirty region map 420 before making file modifications 340 on either mirror 200 or mirror 220. In some embodiments, redundancy abstraction manager 130 may be configured to make file modifications 340 to both mirrors in parallel. In other embodiments, however, redundancy abstraction manager 130 may synchronously update each mirror of the volume in turn. For example, an application appending streaming video data to file, perhaps by recording a video teleconference, may result in file modifications 340. File system 120 may allow redundancy abstraction manager 130 to use its dirty region map 420 to tracking redundancy consistency information for file modifications 340 and redundancy abstraction manager 130 may record dirty region info 430 in dirty region map 420 as a result.

The order in which redundancy abstraction manager 130 may perform file modifications 340 on mirrors 200 and 210 may vary from embodiment to embodiment and from I/O request to I/O request. For instance, in one embodiment redundancy abstraction manager 130 may simultaneously initiate data modifications to both mirrors. In another embodiment, redundancy abstraction manager 130 may consistently make data modifications to one mirror first and then copy those modifications over to the other mirror. In other embodiments, however, redundancy abstraction manager 130 may not consistently use a specific mirror for initially making data modifications. In yet other embodiments, redundancy abstraction manager 130 may initiate data modifications to the mirrors of the volume one after another and the modifications to different mirrors may proceed substantially at the same time, but at different rates and completing at different, unpredictable times.

In one embodiment, saving dirty region info 430 may include marking in dirty region map 420 one or more bits corresponding to the regions of the mirrored volume to be modified by file modifications 340. Once file modifications 340 have been completed on all the mirrors, redundancy abstraction manager 130 may clear or delete dirty region info 430. In one embodiment, redundancy abstraction manager 130 may clear dirty region info 430 from dirty region map 420 immediately after the completion of the file modifications on mirrors 200 and 220, while in another embodiment, storage system 340 may asynchronously, or lazily, clear dirty region map 420. For example, redundancy abstraction manager 130 may not clear dirty region info 430 in dirty region map 420 until redundancy abstraction manager 130 has to mark other dirty region info in dirty region map 420 for another set of data modifications.

In some embodiments, redundancy abstraction manager 130 may record redundancy consistency recovery information using a mechanism other than a dirty region map. For example, redundancy abstraction manager 130 may, in one embodiment, keep a list, or log, of modified blocks, rather than using a region map to track redundancy consistency recovery information. In yet other embodiments, redundancy abstraction manager 130 may log pending write operations in its own mirrored log, complete the write operation to file system 120, then asynchronously write the logged data to the mirrors of the mirrored volume.

Figure 5:
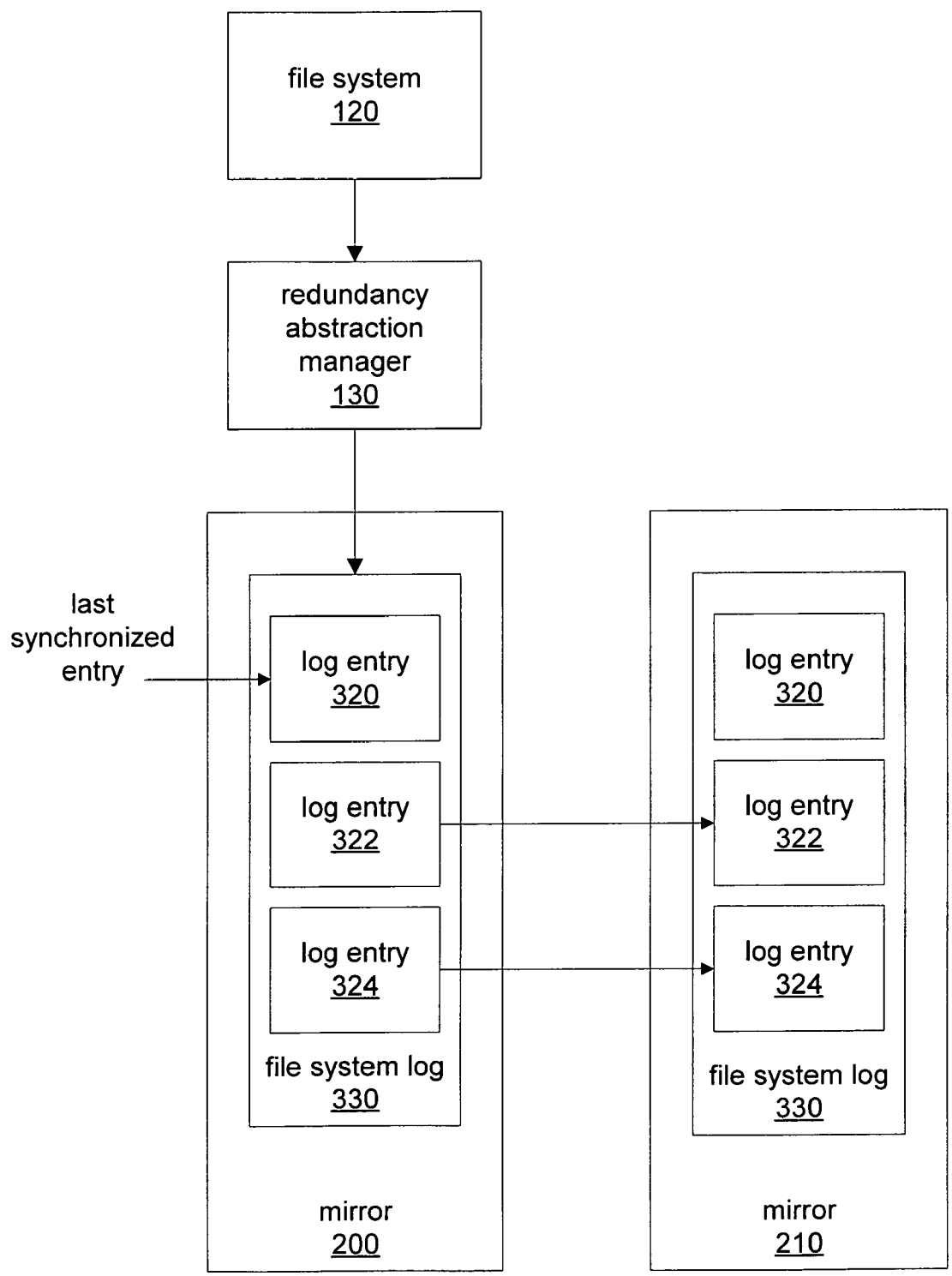
FIG. 5 illustrates one embodiment of synchronizing a mirrored file system log.

FIG. 5 illustrates one embodiment of synchronizing a mirrored file system log across mirrored volumes copies. File system 120 may, in some embodiments, synchronize file system log 330 as part of a mirror synchronization process. For instance, if a system crash or other error occurs, file system 120, may, upon system restart, synchronize file system log 330 prior to synchronizing the mirrored file data on each mirror. In one embodiment, the file system log may be synchronized by copying the entire log from one mirror of the volume to all other mirrors of that volume. In another embodiment, synchronization of the file system log may be performed at the storage system level using a dirty region map to indicate regions of mirrored volume to be synchronized. In another embodiment involving a RAID based storage system, redundancy consistency may be recovered for the system log by writing data to appropriate RAID stripes and ensuring that parity values are calculated and stored for those stripes. In one embodiment, redundancy consistency may be recovered without writing any specific data to the RAID stripes. Instead, the stripes may be initialized to all zeros or some other data initialization pattern, according to some embodiments.

In other embodiments, the file system log may be efficiently synchronized without using a dirty region bit-map at the storage system (e.g. redundant storage abstraction manager or volume manager) level. Instead of copying the entire log, file system 120 may read file system log 330 and use information stored in file system log 330 to determine a last known synchronized point, such as log entry 320 in file system log 330. In such an embodiment, log entry 320 may be the last log entry known to have been mirrored across mirrors 200 and 210. Later log entries, such as log entries 322 or 324 may or may not have been mirrored prior to the system crash or error. File system 120 may synchronize log entries 322 and 324 across the mirrors of redundancy abstraction manager 130 to ensure a consistent state of file system log 330 across mirrors 200 and 210, prior to file system 120 using the contents of file system log 330 to synchronize other data modifications that may be recorded in file system log 330. File system 120 may synchronize file system log 330 in various ways according to different embodiments. As described above, file system 120 may use a specific copy command of redundancy abstraction manager 130 to copy data from one mirror to another mirror, in one embodiment. In another embodiment, file system 120 may utilize a read-writeback I/O mode of redundancy abstraction manager 130 to have redundancy abstraction manager 130 copy any data read from mirror 200 to mirror 210.

Figure 6:
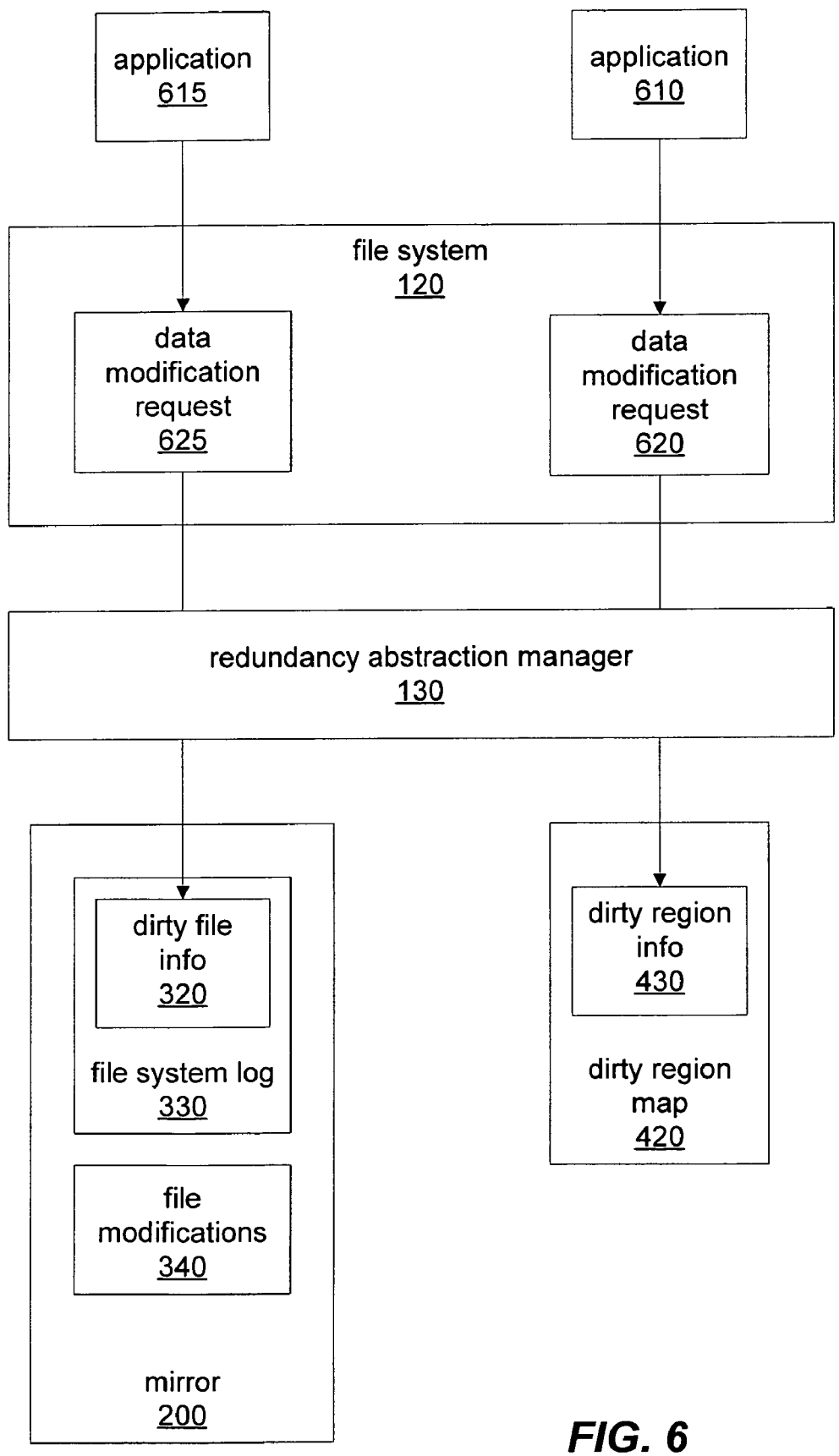
FIG. 6 is a block diagram illustrating the use of different redundancy consistency recovery mechanisms across different applications, according to one embodiment.

FIG. 6 is a block diagram illustrating the selective use of different redundancy consistency recovery mechanisms across different applications, according to one embodiment. File system 120 may, in some embodiments, use different redundancy consistency recovery mechanisms for data modification requests from different applications. As described above, file system 120 may, in certain embodiments, use different redundancy consistency mechanisms for different data modification requests based upon the type of data modifications. For example, redundancy consistency recovery may be achieved for streaming data by using a storage system's dirty region map, while for smaller, more random, data writes, a file system may save dirty file information to a file system journal or log. Additionally, file system 120 may allow individual applications to specify what type of redundancy consistency recovery mechanism should be used for its data I/O. For example, application 615, may typically use small, random data writes, and thus, may specify that file system 120 should use dirty file information, such as dirty file info 320, saved in file system log 330 as the redundancy consistency recovery mechanism for its data I/O. In another embodiment, an application, such as application 610 may specify that file system 120 should not use dirty file information, but instead use redundancy abstraction manager 130's dirty region map 420 as the redundancy consistency recovery mechanism for its data I/O. In yet another embodiment, an application may specify that file system 120 should use no redundancy consistency recovery mechanism. Perhaps the application itself can ensure that its data is properly mirrored upon system startup.

Figure 7:
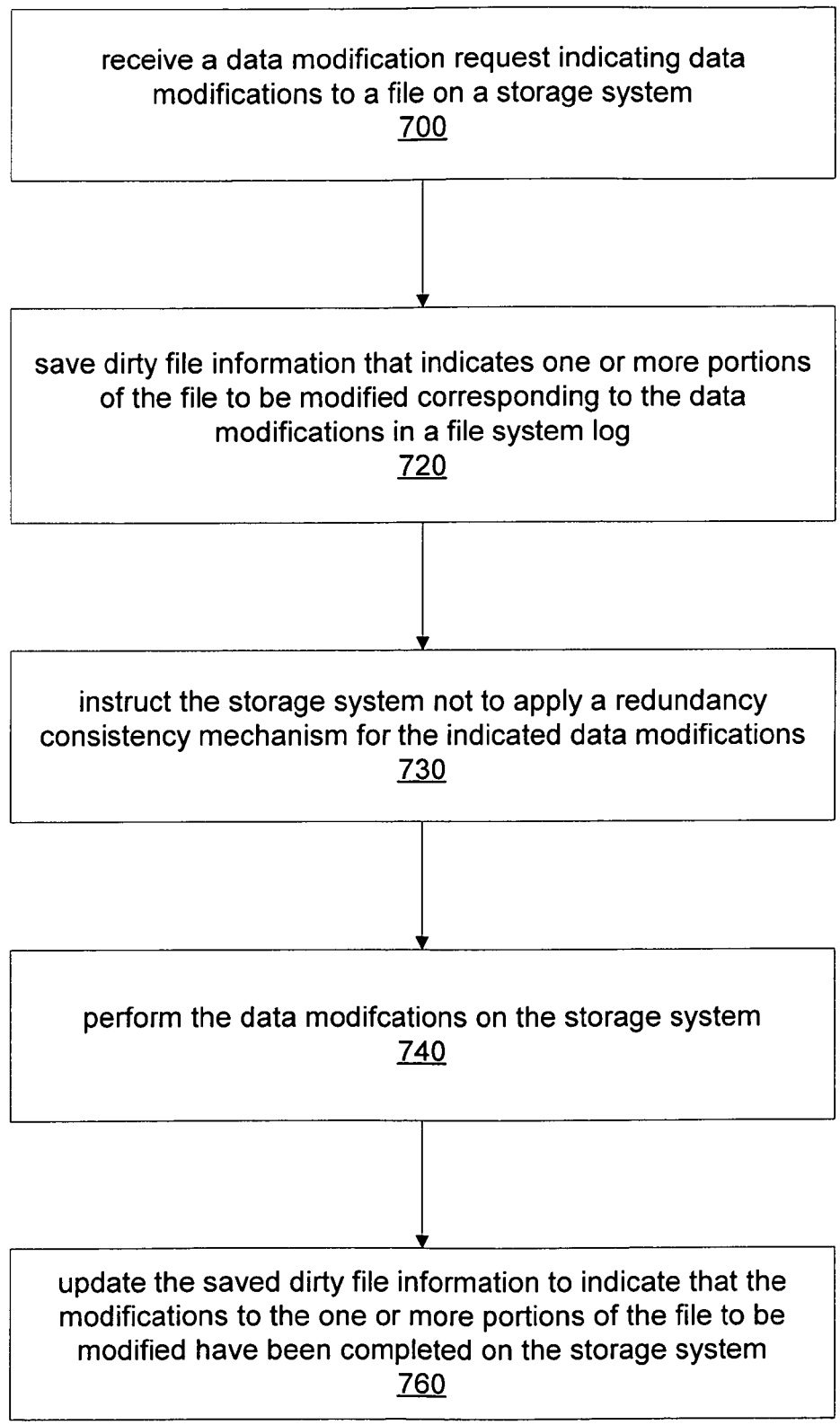
FIG. 7 is a flowchart illustrating one embodiment of a method for file system based redundancy consistency recovery.

FIG. 7 is a flowchart illustrating one embodiment of a method for file system based redundancy consistency recovery. The method illustrated by FIG. 7 may, in one embodiment, be applied to a mirrored storage volume, while in another embodiment may be implemented for a RAID storage volume. According to certain embodiments, a file system may utilize dirty file information saved in a file system log or journal to provide redundancy consistency recovery. For example, as illustrated in block 700, a file system, such as file system 120 may receive a data modification request indicating data modifications to a file on a storage system. For example, a word processor may request the saving of a new version of a file. File system 120 may then save dirty file information that indicates one or more portions of the file to be modified corresponding to the data modifications in a file system log, as illustrated by block 720. For instance, file system 120 may save dirty file info 320 in file system log 330, in one embodiment. In certain embodiments, file system 120 may save information specifying that the entire file is dirty and thus the entire file would have to be synchronized if a crash occurred. In other embodiments, however, file system 120 may include information regarding individual portions of the file and update that information as the corresponding modifications are completed on the storage system. In general, file system 120 may update dirty file info 320 to indicate that modification to portions of a file have been successfully stored to a storage system and that the storage system has provided data redundancy for those modifications. For example, file system 120 may update dirty file info 320 to indicate that data modifications to a file have been stored to each mirror of a mirrored volume. In another example, file system 120 may update dirty file info 320 to indicate that portions of a file have been modified successfully on a RAID volume.

After saving the dirty file information, file system 120 may instruct redundancy abstraction manager 130 not to apply a redundancy consistency mechanism for the indicated data modifications, as illustrated by block 730. File system 120 may additionally perform the data modifications, as illustrated by block 740. For example, file system 120 may write data from a data modification request to volume 170, and redundancy abstraction manager 130 may copy the data modifications to each of the mirrors. Such data modifications may include any sort of data writing or updating. In some embodiments, a file system may have knowledge of the individual mirrors a storage system and may individually write the data to each of the mirrors. In some embodiments, however, file system 120 may write the data just once to volume 170 and redundancy abstraction manager 130 may then write the data to each mirror. After the data modifications have been completed on each mirror, file system 120 may update the saved dirty file information to indicate that portions of the file to be modified have been modified on each of the mirrors, as illustrated by block 760. In other embodiments, file system 120 may write the data to a RAID volume, and a RAID volume manager, such as redundancy abstraction manager 130 may stripe that data across multiple RAID disks and may calculate and store parity information providing redundancy information on one of the RAID disks.

In some embodiments, file system 120 may, after the data modifications have been completed, update file system log 330 to indicate the completion of the modifications. File system 120 may update the saved dirty file information in numerous ways according to various embodiments. In one embodiment, for example, file system 120 may write a new entry into file system log 330 indicating the completion of the data modifications to all the mirrors. In another embodiment, file system 120 may delete the saved dirty file information from file system log 330. In yet another embodiment, file system 120 may modify dirty file info 320 to indicate that the data modifications to the file are now complete and that therefore the file is synchronized across the mirrors. In other embodiments, file system 120 may modify dirty file info 320 to indicate that the data modification to the file have been successfully completed on a RAID volume. Additionally, file system 120 may perform the actual updating of the saved dirty file information in different ways in different embodiments. For example, in one embodiment, file system 120 may update dirty file information when the relevant file is closed by the accessing application. In another embodiment, file system 120 may update saved dirty file information lazily during a period of inactivity. In yet other embodiments, file system 120 may update dirty file information when saving other information to file system log 330.

Please note that various embodiments may implement the method illustrated in FIG. 7 in numerous ways, and that the specific steps shown in FIG. 7 are merely one of many possible arrangements. Other embodiments may include additional or fewer steps in their implementation of the method illustrated.

Figure 8:
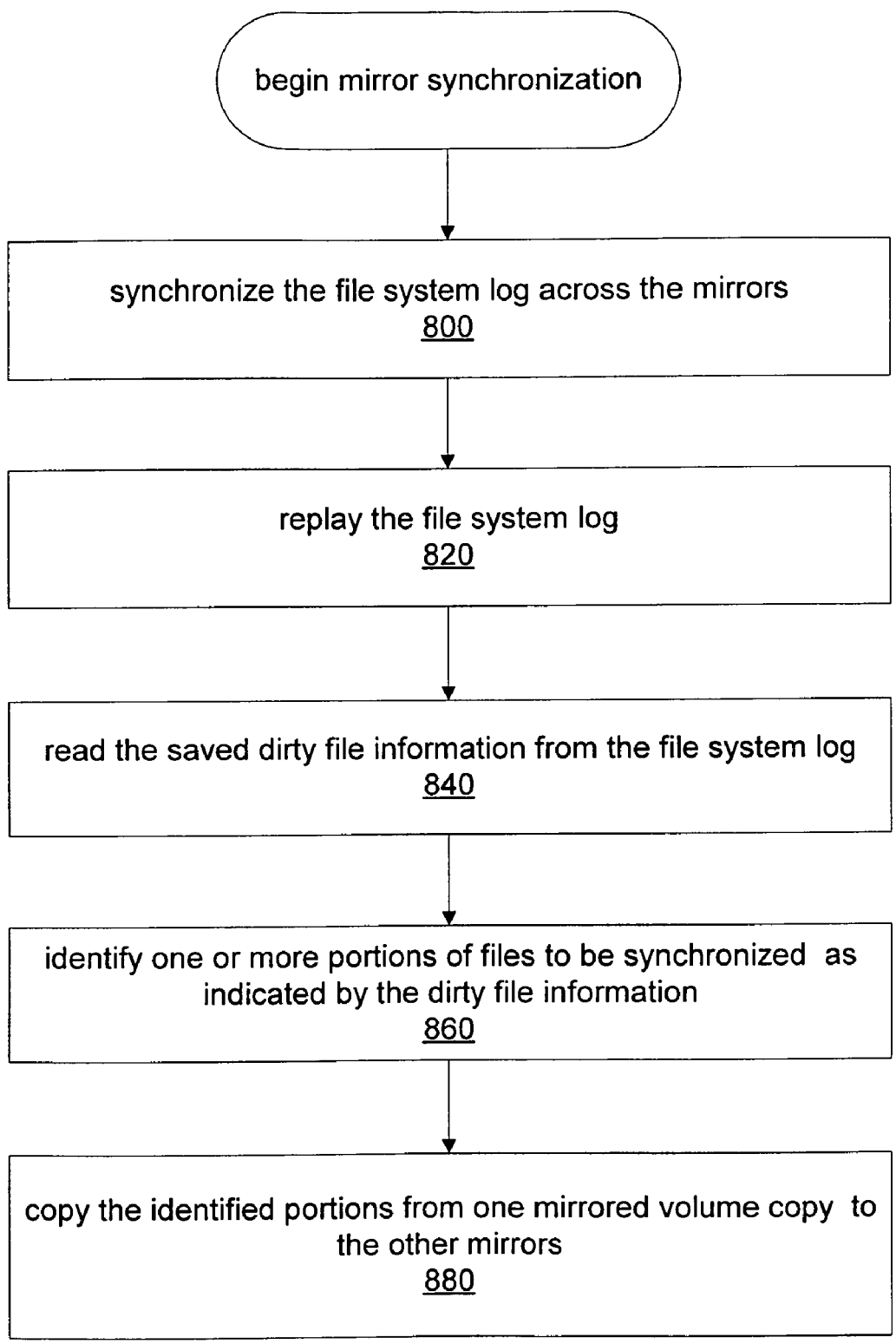
FIG. 8 is a flowchart illustrating a method for mirror synchronization using file system based redundancy consistency recovery, according to one embodiment.

FIG. 8 is a flowchart illustrating a method for mirror synchronization using file system based redundancy consistency recovery, according to one embodiment. As illustrated in FIG. 8, a file system may upon recovery after a system crash or other error, synchronize mirrors of a mirrored volume using saved dirty file information from a file system log or journal. For example, a file system may, in one embodiment, begin mirror synchronization by synchronizing the file system log across the mirrors as illustrated by block 800. For instance, file system 120 may synchronize file system log 330 across mirrors 145 and 155 of volume 170. The various ways in which file system 120 may synchronize file system log 330 may vary from embodiment to embodiment, as described above regarding FIG. 5. When storing data to a RAID volume, upon system recovery, the RAID volume may have one or more stripes for which parity information was not successfully calculated and stored prior to the system crash. In such an example, file system 120 may ensure redundant data consistency by storing data to the RAID volume such that any stripe that was not successfully completed before the system crash will be written and that parity information will be calculated and stored, according to one embodiment. The manner in which file system 120 may ensure the redundancy consistency of stripes on a RAID volume may vary from embodiment to embodiment. For example, in one embodiment, file system 120 may write data to the inconsistent stripe by saving data to the same file offset that was being written before the system crash and the RAID volume manager may automatically calculate and store parity information. In another embodiment, file system 120 may be configured to request that a RAID volume manager calculate and store parity information for a particular stripe in the RAID volume.

After synchronizing file system log 330, the file system may, in some embodiments, replay the file system log, as illustrated by block 820. When replaying a file system log, such as file system log 330, file system 120 may ensure that any modification to file system metadata made before a crash or error are performed. For example, in some embodiments, redundancy abstraction manager 130 may lazily perform metadata updates, such as extending a file to which data has been appended. In such an embodiment, a system crash may occur before redundancy abstraction manager 130 actually completed the metadata change. Thus, upon recovery, file system 120 does not know whether the metadata modification was successfully completed or not. In such an embodiment, file system 120 may first replay the file system log to ensure that any such changes are successfully completed on the volume. In one embodiment file system 120 may ensure that metadata changes replayed from the system log are successfully mirrored across all mirrors of a mirrored volume. In another example, file system 102 may replay the log to ensure that metadata changes are successfully striped and that parity or other redundancy information is successfully stored to a RAID volume.

After replaying the file system log, file system 120 may read the saved dirty file information, such as dirty file info 320, from the file system log, such as file system log 330, as illustrated by block 840. Using the dirty file information read from the file system log, file system 120 may identify one or more portions of files to be synchronized as indicated by the dirty file information, as illustrated by block 860, in certain embodiments. For example, file system 120 may have saved dirty file information 320 for a file in file system log 330 and may have started performing the data modifications on the file when a system crash occurred. Upon recovery, file system 120 may read the saved dirty file info 320 from file system log 330 and identify the file as dirty from dirty file info 320. In another embodiment, file system 120 may have performed data modifications that were successfully mirrored to both mirrors 200 and 210 and saved dirty file information indicating which portions of the file had data modifications mirrored across both mirrors.

During mirror synchronization, a file system may be able to identify from saved dirty file info 320 those portions of the file that should be synchronized. When synchronizing those portions of files identified from the file system log, file system 120 may copy the identified portions from one mirror to the other mirrors, as illustrated by block 880. A file system may copy the identified portions from one mirror to the others in a number of ways, according to various embodiments. For example, saved dirty file information may directly indicate one or more portions of one or more files that require synchronization, according to one embodiment. In other embodiments, saved dirty file information may indicate one or more portions of files that are known to have redundancy consistency (e.g. that have already been synchronized). And file system 120 may determine one or more remaining portions of those files that are not indicated by saved dirty file information as having redundancy consistency and therefore may require synchronization. As described above, a file system itself may copy the relevant data from one mirror to another, or alternatively, may utilize redundancy abstraction manager 130 to copy the data, such as by using an atomic copy, or a read-writeback mode of I/O. Alternatively, in one embodiment, file system 120 may write, or have redundancy abstraction manager 130 write, information to a dirty region map of redundancy abstraction manager 130 indicating the regions of data that needs to be resynchronized and then let redundancy abstraction manager 130 synchronize the relevant data across the mirrors.

In one embodiment, file system 120 may be storing data to a RAID volume and may, upon system recovery, recover redundancy consistency for RAID volume in a fashion similar to that described above regarding mirror synchronization. For example, file system 120 may, upon system recovery, recover redundancy consistency for the file system log and then replay the log to ensure that any metadata modifications started prior to the system crash are successfully completed before continuing. When recovering redundancy consistency for the file system log on a RAID volume, file system 120 may write data to one or more stripes of the RAID volume to ensure that the parity information is updated to correctly provide redundancy for the striped data. If the data being written prior to the crash was not critical, or if the metadata for the data had not been updated, it may not be important what actual data file system 120 writes to the relevant RAID stripe. For instance, it may only be important to ensure redundancy consistency because the application requesting the data modifications prior to the system crash may not have any expectations regarding whether the data was actually stored successfully or not. However, if metadata modifications were being written prior to the system crash, it may be important to replay those metadata modifications from the file system log.

Additionally, in some embodiments, redundancy abstraction manager 130 may also synchronize data across mirrors based on its own recorded redundancy consistency recovery information, such as a dirty region map or scoreboard. In one embodiment, redundancy abstraction manager 130 may perform its synchronization before file system 120 begins its mirror synchronization, while in other embodiments, file system 120 may complete its redundancy consistency recovery process before redundancy abstraction manager 130 performs its synchronization process.

According to some embodiments, a file system may be able to reduce the amount of overhead and effort required to perform mirror synchronization after hardware, software, or other operational failures by using saved dirty file information as described herein. For example, in some embodiments, a file system may synchronize only the modified portions of a few files rather than copying large regions of data based on a storage system's dirty region map. For instance a file system may be configured to keep dirty file information on a more fine-grained basis than a storage system's dirty region map. In one embodiment, a file system specifically synchronizing only indicated dirty files might prevent a storage system from having to copy an entire volume. Additionally, a file system writing dirty file information to an existing file system log when writing other data to the log may result in fewer I/Os by avoiding the need to update a dirty region map for every requested file modification, according to one embodiment. For example, a file system may already be saving information, such as metadata, to a file system log and thus dirty file information may be stored in the log without incurring an additional I/O. In another example, according to another embodiment, a file system may save dirty file information as part of a file's metadata and then may, during recovery from a crash or other error, the file system search through the metadata to identify file that should be synchronized across mirrors.

Please note that various embodiments may implement the method illustrated in FIG. 8 in numerous ways, and that the specific steps shown in FIG. 8 are merely one of many possible arrangements. Other embodiments may include additional or fewer steps in their implementation of the method illustrated.

Figure 9:
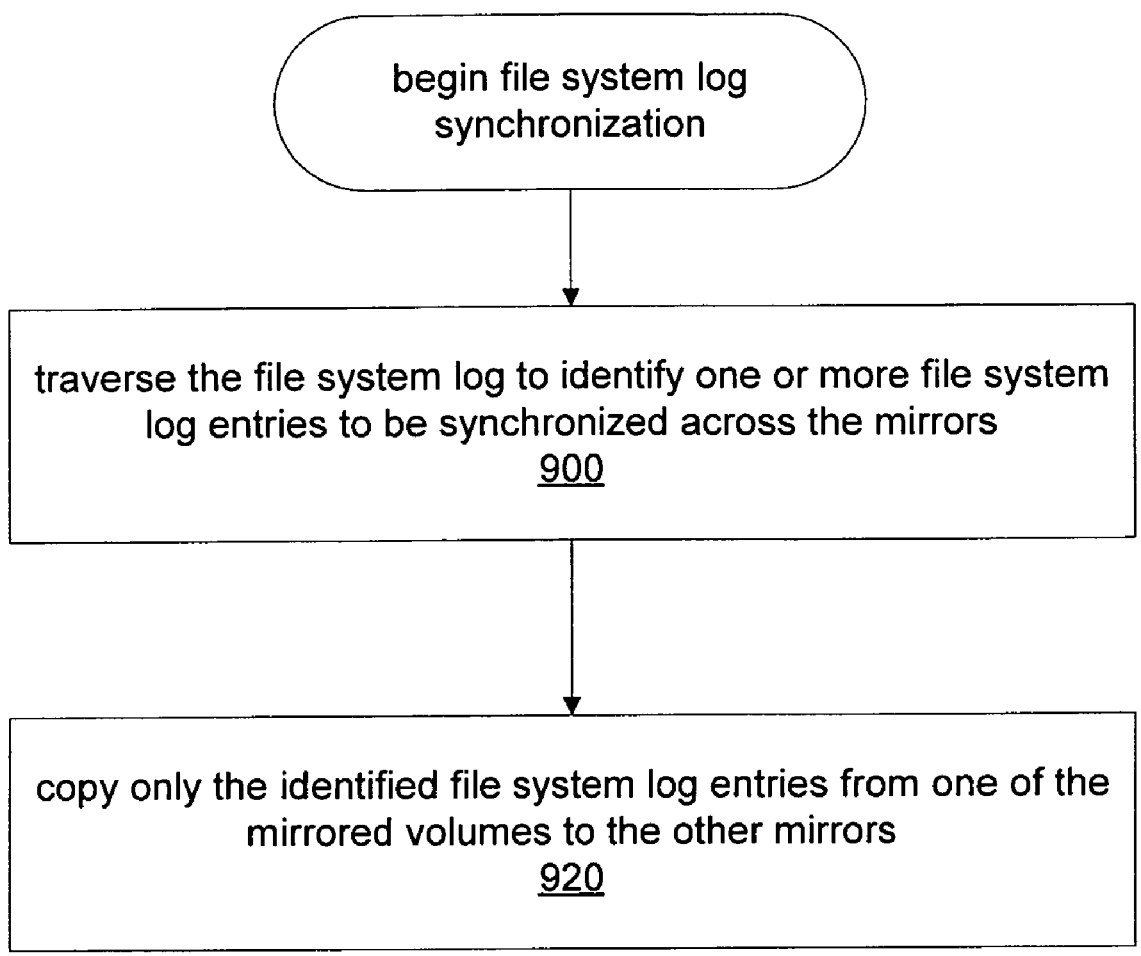
FIG. 9 is a flowchart illustrating one embodiment of a method for synchronizing a file system log.

FIG. 9 is a flowchart illustrating one embodiment of a method for synchronizing a file system log across mirrors. As described above regarding block 800 of FIG. 8, a file system may begin mirror synchronization by synchronizing the file system log, according to certain embodiments. Since, according to some embodiments, a file system may be relying upon a file system log to determine which files, or portions of files, should be synchronized, the file system log itself may need to be synchronized before the file system reads dirty file information from it. When synchronizing a file system log as part of a mirror synchronization process, a file system, such as file system 120, may be configured to examine the file system log to determine those portions, or entries, of the log that should be synchronized and thus not have to synchronize the entire file system log. For example, file system 120, may in one embodiment, begin synchronizing a file system log, such as file system log 330, by traversing the file system log to identify one or more file system log entries to be synchronized across the mirrors, as illustrated by block 900. In one embodiment, file system 120 may examine file system log 330 to determine one or more log entries that are known to be synchronized and therefore identify the remaining log entries to be synchronized.

After identifying the system log entries to be synchronized, file system 120 may, in some embodiments, then copy only the identified file system log entries from one of the mirrors to each of the other mirrors. For instance, in one embodiment, as described above regarding FIG. 5, file system 120 may analyze file system log 330 to identify a last known synchronized entry, such as log entry 320, and then be able to identify the log entries to be synchronized, such as log entries 322 and 324. File system 120 may then copy only log entries 322 and 324 from mirror 200 to mirror 210, according to one embodiment. Thus, according to some embodiments, a file system log, such as file system log 330 may be synchronized by a file system, such as file system 120, without using dirty region tracking or any other storage system based redundancy consistency mechanism. As described above, a file system may copy the data to be synchronized between different mirrors of a volume in a number of different ways, according to different embodiments. For example, in one embodiment, file system 120 may have knowledge of the different mirrors and may be able to read data from and write data to individual mirrors. In other embodiments, however, file system 120 may not have any knowledge of the individual mirrors and thus rely upon redundancy abstraction manager 130 to copy the data, perhaps by using an atomic copy, or a read-writeback mode of redundancy abstraction manager 130.

In certain embodiments, file system 120 may be configured to always synchronize a specific number of log entries during recovery. For example, in one embodiment, file system 120 may be configured to ensure that each modification to file system log 330 is synchronously mirrored across mirrors 200 and 210, and thus may be able to assume that only a limited number of log entries (e.g. two entries) need synchronization on recovery. In other embodiments, however, file system 120 may synchronize the entire file system log during mirror synchronization.

Please note that various embodiments may implement the method illustrated in FIG. 9 in numerous ways, and that the specific steps shown in FIG. 9 are merely one of many possible arrangements. Other embodiments may include additional or fewer steps in their implementation of the method illustrated.

Figure 10:
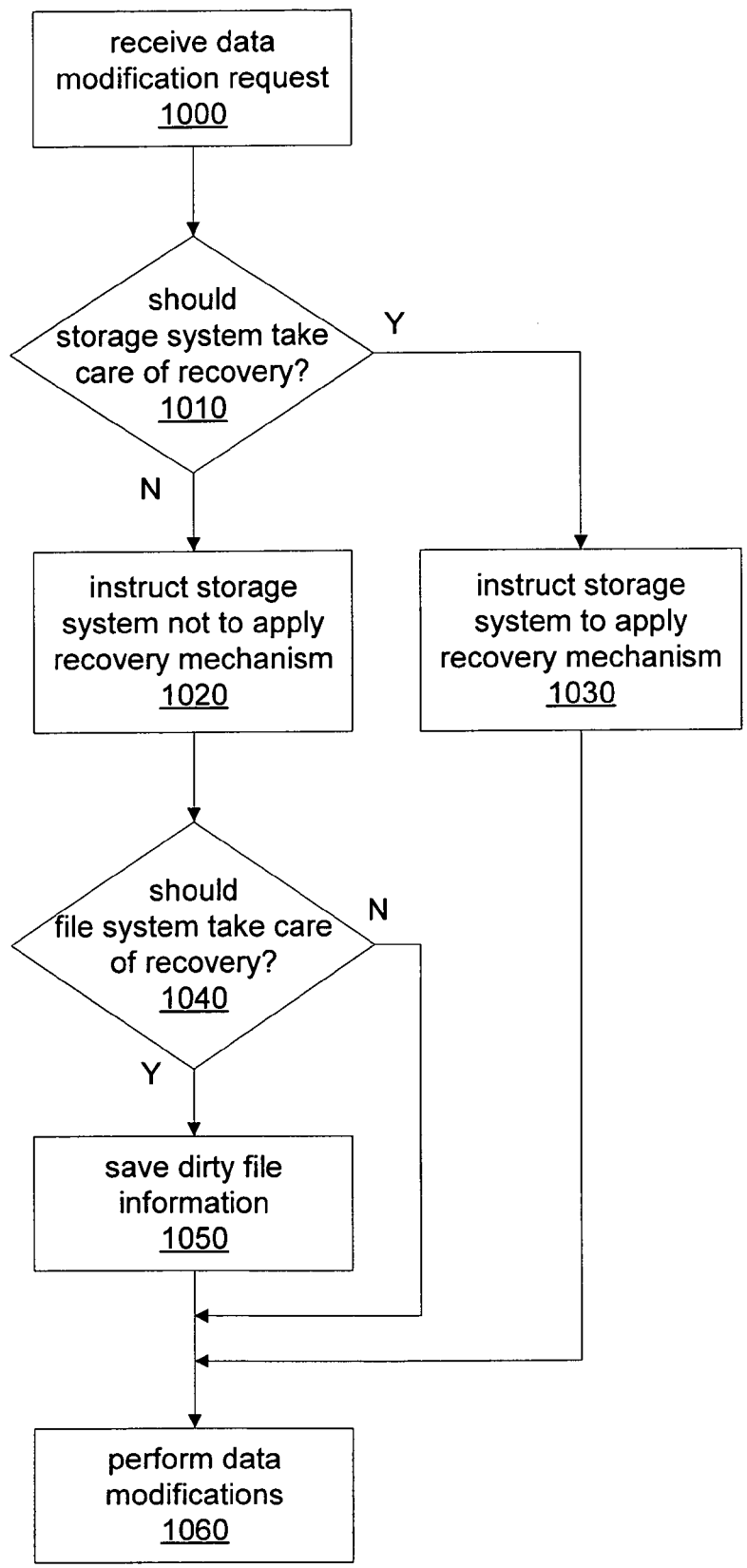
FIG. 10 is a flowchart illustrating a method for implementing application specific redundancy consistency recovery techniques, according to one embodiment.

FIG. 10 is a flowchart illustrating a method for implementing selective redundancy consistency recovery techniques on a data modification request basis, according to one embodiment. In some embodiments, and as described above regarding FIG. 6, a file system, such as file system 120 may be configured to use different redundancy consistency recovery mechanisms for different data modifications, e.g. from different applications. FIG. 10 illustrates one embodiment where a file system is configured to use either dirty file information saved in a file system log, a storage system's redundant storage consistency recovery mechanism, such as a dirty region map, or allow an application to take care of its own redundant storage consistency recovery. For example, file system 120 may, in certain embodiments, receive a data modification request, as illustrated by block 1000, and then determine whether the storage system should take care of redundant storage consistency recovery, as illustrated by block 1010. For instance, an application sending the data modification request may specify, either through a separate API, or as part of the data modification request itself, that the storage system's dirty region map should be used for redundant storage consistency recovery of the data modifications associated with the data modification request, in one embodiment. In another embodiment, file system 120, may be configured to determine from the type of data modification request or the type of data being modified, that the storage system's redundant storage consistency recovery mechanism should be used.

If file system 120 determines that the storage system's redundant storage consistency recovery mechanism should be used, as illustrated by the positive exit from block 1010, file system 120 may, in one embodiment, allow redundancy abstraction manager 130 to apply its redundant storage consistency recovery mechanism, as illustrated by block 1030. For example, in one embodiment, redundancy abstraction manager 130 may be configured to automatically apply its redundant storage consistency recovery mechanism. In other embodiments, file system 120 may have to instruct redundancy abstraction manager 130 to apply its redundant storage consistency recovery mechanism. The manner in which file system 120 may instruct redundancy abstraction manager 130 to use its redundancy consistency recovery mechanism, such as dirty region map 420, may vary from embodiment to embodiment. In one embodiment, file system 120 may use a specific API or command message, while, in another embodiment, file system 120 may include information when performing the specific data modifications that instruct redundancy abstraction manager 130 to use its redundancy consistency recovery mechanism. If, according to one embodiment, file system 120, determines that redundancy abstraction manager 130 should not use its redundancy consistency recovery mechanism, as illustrated by the negative output from block 1010, file system 120 may instruct redundancy abstraction manager 130 not to apply its redundancy consistency recovery mechanism, as illustrated by block 1020. File system 120 may use any of the same types of techniques to instruct redundancy abstraction manager 130 not in use its redundancy consistency recovery mechanism as described above regarding instructing redundancy abstraction manager 130 to use its redundancy consistency recovery mechanism, according to various embodiments.

After instructing redundancy abstraction manager 130 not in use its redundancy consistency recovery mechanism, file system 120 may, in one embodiment, determine whether it should take care of redundancy consistency recovery, as illustrated by block 1040. If file system 120 determines that it should, it may save dirty file information in its file system log, as illustrated by block 1050, according to one embodiment. Upon determining how resynchronization information should be handled, file system 120 may proceed to perform the data modifications associated with the received data modification request, as illustrated by block 1060 and described above. If file system 120 determines that neither redundancy abstraction manager 130, nor file system 120 itself, should take care of redundancy consistency recovery, no redundancy consistency recovery mechanism may be used, in some embodiments. In certain embodiments, an application may be configured to take care of its own redundancy consistency recovery, while in other embodiments the exact nature of the data modifications may obviate the need to use redundancy consistency recovery. For example, a data modification may only require appending new data to the end of an existing file, and the file system, or storage system, may modify the file's metadata, such as an inode reflecting the new size of the file, after the data modifications have been completed. No redundancy consistency tracking or recovery may be required for such modifications, in such an example. Even if the storage system crashed before the data modifications were successfully completed, if the metadata update for the file had not yet been started (since the data write had not yet been fully completed by the storage system) the existing metadata would ensure that the copies of the file on different mirrors still reflected the same old file length, and therefore only the file contents before the file modifications were made. Similarly, in another example, a file system de-fragmentation operation performed on one mirrored volume may not require use of any redundancy consistency recovery mechanisms because such data modifications may not be committed until after the data has been successfully modified on all mirrors. A copy-on-write operation may be another example where neither the file system nor redundant storage abstraction manager need provide for redundancy consistency recovery. Thus, in some embodiments, no redundancy consistency may be required for certain data modification requests and file systems 120 may be configured to determine on a file modification request basis whether, and what kind of, redundancy consistency recovery should be used.

Please note that various embodiments may implement the method illustrated in FIG. 10 in numerous ways, and that the specific steps shown in FIG. 10 are merely one of many possible arrangements. Other embodiments may include additional or fewer steps in their implementation of the method illustrated.

Figure 11:
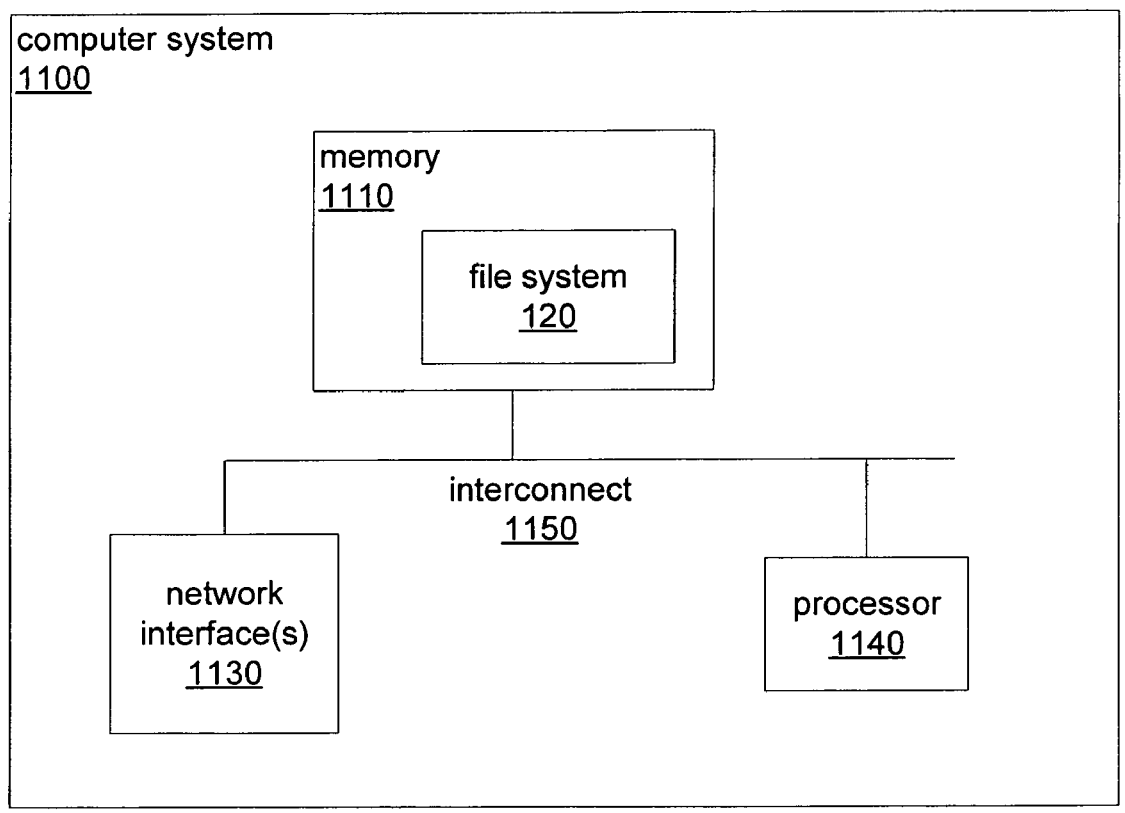
FIG. 11 is a block diagram illustrating a computer system suitable for implementing file system based redundancy consistency recovery, according to one embodiment.

FIG. 11 illustrates a computing system capable of implementing file system based redundancy consistency recovery as described herein and according to various embodiments. Computer system 1100 may be any of various types of devices, including, but not limited to, a personal computer system, desktop computer, laptop or notebook computer, mainframe computer system, workstation, network computer, a consumer device such as a mobile phone, pager, a smart appliance, or any type of networkable peripheral device such as storage devices, switches, modems, routers, etc, or in general any type of networkable computing device. Computer system 1100 may include at least one processor 1140. Processor 1140 may couple across interconnect 1150 to memory 1110 and network interface(s) 1130. Network interface(s) 1130 may be any of various types of interfaces configured to couple with and communicate over any of a number of network technologies and topologies as described above regarding FIG. 1.

Memory 1110 is representative of various types of possible memory media, also referred to as "computer accessible media." Hard disk storage, floppy disk storage, removable disk storage, flash memory and random access memory (RAM) are examples of memory media. The terms "memory" and "memory medium" may include an installation medium, e.g., a CD-ROM or floppy disk, a computer system memory such as DRAM, SRAM, EDO RAM, SDRAM, DDR SDRAM, Rambus RAM, etc., or a non-volatile memory such as a magnetic media, e.g., a hard drive or optical storage. The memory medium may include other types of memory as well, or combinations thereof. In some embodiments, memory 1110 may include program instructions configured to implement file system based redundancy consistency recovery as described above. In certain embodiments memory 1110 may include program instructions configured to implement a file system, such as file system 120. In one embodiment, file system 120 may include program instructions configured to perform file system based redundancy consistency recovery.

Although the embodiments above have been described in detail, numerous variations and modifications will become apparent once the above disclosure is fully appreciated. It is intended that the following claims be interpreted to embrace all such variations and modifications.

What is claimed is:

1. A method, comprising:
    receiving data modification requests each indicating one or more data or metadata modifications for a file on a storage system, wherein the storage system comprises a plurality of storage devices configured to store data and redundancy data for the file;
    for each of a plurality of the data modification requests:
        determining whether or not to save dirty file information at a file system level to track redundancy consistency information for the data modification request;
    in response to determining that dirty file information should be saved at the file system level for at least one of the plurality of data modification requests:
        saving dirty file information at the file system level, wherein the dirty file information indicates one or more portions of the file to be modified, wherein the one or more portions correspond to the indicated one or more data or metadata modifications;
        instructing the storage system not to apply a redundancy consistency mechanism to the one or more data or metadata modifications indicated in the at least one data modification request; and
    performing the indicated one or more data or metadata modifications on the storage system.

2. The method of claim 1, wherein said determining whether or not to save dirty file information comprises determining whether or not data modifications indicated by the data modification requests may cause the file to enter a potentially inconsistent state.

3. The method of claim 1, further comprising performing a redundancy consistency recovery operation on the storage system, wherein the redundancy consistency recovery operation comprises:
    retrieving the saved dirty file information from the file system; and
    recovering redundancy consistency for each file indicated by the dirty file information, wherein said recovering redundancy consistency comprises updating redundancy data for each indicated file.

4. The method of claim 3, further comprising not recovering redundancy consistency for one or more portions of one or more files, wherein the dirty file information indicates that the modifications to the one or more portions have been completed on the storage system.

5. The method of claim 3, wherein the storage system comprises a plurality of mirrors; and wherein said updating redundancy data comprises copying the one or more portions of each file from one mirror to each other mirror.

6. The method of claim 5, wherein said copying comprises:
    configuring the storage system to operate in a READ-WRITEBACK mode of I/O, wherein when operating in a READ-WRITEBACK mode of I/O, the storage system is configured to write any data read from any one of the mirrors to each of the other mirrors; and
    reading the one or more portions of each file from one of the mirrors.

7. The method of claim 5, wherein said copying comprises saving information to enable a redundancy consistency mechanism of the storage system to copy the one or more portions from one of the mirrors to each of the other mirrors.

8. The method of claim 7, wherein the storage system comprises a volume manager, wherein said saving information to enable a redundancy consistency mechanism of the storage system to copy the one or more portions comprises marking one or more regions as dirty in a dirty region map of the storage system, and wherein the volume manager performs said copying according to the dirty region map.

9. The method of claim 8,
    wherein the storage system comprises a volume manager;
    wherein said saving information to enable a redundancy consistency mechanism of the storage system to copy the one or more portions comprises storing in a log on the storage system information about regions of the volume which are being modified; and
    wherein the volume manager performs said copying according to the information stored in the log.

10. The method of claim 3, wherein the storage system comprises a RAID configuration; and wherein said updating redundancy data comprises updating redundancy data for one or more RAID stripes corresponding to the files indicated by the dirty file information.

11. The method of claim 1, wherein said determining is based on information received from an application associated with each data modification request specifying whether the respective data modifications should be tracked by a redundancy consistency mechanism of the storage system.

12. The method of claim 1, further comprising:
    wherein, for one or more of the plurality of the data modification requests, said determining is based on information received from an application associated with those one or more data modification requests; wherein the received information indicates that the application will maintain recovery information for respective data modifications; and in response to determining that the application will maintain recovery information:
not performing said saving for those data modification requests that the application will maintain recovery information; and
instructing the storage system not to apply the redundancy consistency mechanism to the respective data modifications.

13. The method of claim 1, further comprising:
determining for each of one or more of the data modification requests not to save redundancy consistency recovery information for the respective indicated data modifications, wherein said determining is based respectively on each of the one or more data modification requests; and
instructing the storage system not to apply a redundancy consistency mechanism to the respective data modifications indicated in the corresponding data modification request.

14. The method of claim 1, wherein said receiving, said determining, said saving, said instructing and said performing are performed by a file system on one of a host device, a storage device, or an object storage device.

15. A system, comprising:
a processor; and
a memory coupled to the processor, wherein the memory comprises program instructions configured to:
receive data modification requests each indicating one or more data modifications to a file on a storage system, wherein the storage system comprises a plurality of storage devices configured to store data and redundancy data for the file; and
for each of a plurality of the data modification requests:
determine whether or not to save dirty file information at a file system level to track redundancy consistency information for the data modification request;
in response to determining that dirty file information should be saved for at least one of the plurality of data modification requests:
save dirty file information at the file system level, wherein the dirty file information indicates one or more portions of the file to be modified, wherein the one or more portions correspond to the one or more data modifications indicated in the at least one data modification request; and
instruct the storage system not to apply a redundancy consistency mechanism for the indicated one or more data modifications; and
perform the indicated one or more data modifications on the storage system.

16. The system of claim 15, wherein the program instructions are further configured to perform a redundancy consistency recovery operation on the storage system, wherein as part of the redundancy consistency recovery operation the program instructions are further configured to:
retrieve the saved dirty file information from the file system; and
recover redundancy consistency for each file indicated by the dirty file information, wherein said recovering redundancy consistency comprises updating redundancy data for each indicated file.

17. The system of claim 16, wherein the storage system comprises a plurality of mirrors; and wherein as part of said updating redundancy data the program instructions are further configured to copy the one or more portions of each file from one mirror to each other mirror.

18. The system of claim 15, wherein the program instructions are further configured to:
determine that the one or more modifications to the one or more portions of a file to be modified have been completed on the storage system; and
update the saved dirty file information to indicate that the one or more modifications to the one or more portions of the file to be modified have been completed on the storage system.

19. The system of claim 18, wherein the program instructions are further configured to perform a redundancy consistency recovery operation on the storage system, wherein as part of the redundancy consistency recovery operation the program instructions are further configured to:
read information from the file system log indicating metadata modifications for one or more files; and
modify the metadata for one or more files on the storage system as indicated by the information read from the file system log, wherein said modifying comprises modifying the metadata for each of the one or more files on the storage system.

20. A computer accessible storage medium, comprising program instructions configured to implement:
receiving data modification requests each indicating one or more data modifications to a file on a storage system, wherein the storage system comprises a plurality of storage devices configured to store data and redundancy data for the file; and
for each of a plurality of the data modification requests:
determining whether to save dirty file information at a file system level to track redundancy consistency information for the data modification request;
in response to determining that dirty file information should be saved for at least one of the plurality of data modification requests:
saving dirty file information at the file system level, wherein the dirty file information indicates one or more portions of the file to be modified, wherein the one or more portions correspond to the one or more data modifications indicated in the at least one data modification request; and
instructing the storage system not to apply a redundancy consistency mechanism to the one or more data modifications indicated in the data modification request; and
performing the indicated one or more data modifications on the storage system.

* * * * *